United States Patent
Cho

(10) Patent No.: US 7,982,708 B2
(45) Date of Patent: Jul. 19, 2011

(54) DISPLAY DEVICE INCLUDING A BACKLIGHT UNIT AND DRIVING METHOD OF THE BACKLIGHT UNIT USING AN AVERAGE GRAYSCALE LEVEL OF AN IMAGE

(75) Inventor: Duck-Gu Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 812 days.

(21) Appl. No.: 12/013,139

(22) Filed: Jan. 11, 2008

(65) Prior Publication Data

US 2008/0246780 A1 Oct. 9, 2008

(30) Foreign Application Priority Data

Apr. 4, 2007 (KR) ........................ 10-2007-0033271

(51) Int. Cl.
*G09G 3/36* (2006.01)
(52) U.S. Cl. ........................................ 345/102
(58) Field of Classification Search .............. 345/87, 345/102

See application file for complete search history.

(56) References Cited

U.S. PATENT DOCUMENTS

| | | | | |
|---|---|---|---|---|
| 6,031,328 A | * | 2/2000 | Nakamoto | 313/495 |
| 2004/0008177 A1 | * | 1/2004 | Ahn | 345/102 |
| 2007/0188438 A1 | * | 8/2007 | Fletcher et al. | 345/102 |
| 2007/0268429 A1 | * | 11/2007 | So | 349/106 |

FOREIGN PATENT DOCUMENTS

| | | |
|---|---|---|
| JP | 2002-108305 A | 4/2002 |
| JP | 2006-308631 | 11/2006 |
| KR | 10-2004-0107559 A | 12/2004 |
| KR | 10-2006-0103399 | 9/2006 |

OTHER PUBLICATIONS

Patent Abstracts of Japan, Publication No. 2006-308631; Date of Publication: Nov. 9, 2006; in the name of Kenji Mori.
Korean Patent Abstracts, Publication No. 1020060103399 A; Date of Publication: Sep. 29, 2006; in the name of Kazuto Kimura et al.

* cited by examiner

*Primary Examiner* — Chanh Nguyen
*Assistant Examiner* — Jonathan Blancha
(74) *Attorney, Agent, or Firm* — Christie, Parker & Hale, LLP

(57) ABSTRACT

A display device is provided. The display device includes: a panel assembly including: a plurality of gate lines; a plurality of data lines; and a plurality of pixels defined by the plurality of gate lines and the plurality of data lines. The device also includes a backlight unit including: a plurality of scan lines; a plurality of column lines; and a plurality of backlight unit pixels defined by the plurality of scan lines and the plurality of the column lines. The backlight unit is configured to: calculate an average grayscale level of an image of a first frame; determine a first grayscale level according to the plurality of pixels corresponding to the panel assembly pixels; and apply a weight value corresponding to the average grayscale level to change the first grayscale level to a compensated grayscale level.

9 Claims, 8 Drawing Sheets

DISPLAY DEVICE INCLUDING A BACKLIGHT UNIT AND DRIVING METHOD OF THE BACKLIGHT UNIT USING AN AVERAGE GRAYSCALE LEVEL OF AN IMAGE

CROSS-REFERENCE TO RELATED APPLICATION

This application claims priority to and the benefit of Korean Patent Application No. 10-2007-0033271 filed in the Korean Intellectual Property Office on Apr. 4, 2007, the entire content of which is incorporated herein by reference.

BACKGROUND OF THE INVENTION (a) Field of the Invention

The present invention relates to a display device. More particularly, the present invention relates to a display device having a backlight unit that operates in synchronization with a display image.

(b) Description of the Related Art

Flat panel displays, such as liquid crystal displays (LCDs), are display devices that display images by varying the amount of transmitted light for pixels using dielectric anisotropy of liquid crystal in which a twist angle varies in accordance with an applied voltage. These liquid crystal displays are advantageous due to their lightweight, small size, and low power consumption, as compared with a cathode ray tube which is a representative image display device.

The liquid crystal display generally includes a liquid crystal panel assembly and a backlight unit that is provided at a rear side of the liquid crystal panel assembly and supplies light to the liquid crystal panel assembly.

When the liquid crystal panel assembly is composed of an active liquid crystal panel assembly, the liquid crystal panel assembly includes a pair of transparent substrates, a liquid crystal layer interposed between the transparent substrates, polarizing plates disposed on the outside of the transparent substrates, a common electrode provided on an inner surface of one of the transparent substrates, pixel electrodes and switches provided on an inner surface of the other transparent substrate, color filters that supply red, green and blue colors to three sub-pixels forming one pixel, and the like.

The liquid crystal panel assembly is supplied with light emitted from the backlight unit and transmits or blocks the light using the liquid crystal layer so as to form the predetermined image.

The above information disclosed in this Background section is only for enhancement of understanding of the background of the invention and therefore it may contain information that does not form the prior art that is already known in this country to a person of ordinary skill in the art.

SUMMARY OF THE INVENTION

Some embodiments of the present invention provide a liquid crystal display and a driving method thereof capable of forming a dynamic image by increasing dynamic contrast of the image and providing light having different intensity using a weight value corresponding to image data.

Further, some embodiments of the present invention provide a liquid crystal display and a driving method thereof capable of reducing power consumption of a backlight unit.

A display device is provided. The display device includes: a panel assembly including: a plurality of gate lines for transmitting a plurality of gate signals; a plurality of data lines for transmitting a plurality of data signals; and a plurality of pixels defined by the plurality of gate lines and the plurality of data lines. The device also includes a backlight unit including: a plurality of scan lines for transmitting a plurality of scan signals; a plurality of column lines for transmitting a plurality of light-emitting data signals; and a plurality of backlight unit pixels defined by the plurality of scan lines and the plurality of the column lines, wherein the backlight unit is configured to: calculate an average grayscale level of an image of a first frame; determine a first grayscale level according to the plurality of pixels corresponding to the panel assembly pixels; and apply a weight value corresponding to the average grayscale level to change the first grayscale level to a compensated grayscale level.

In one embodiment the weight value is a ratio of maximum compensation luminance to maximum luminance represented by the backlight unit and is set to correspond to the average grayscale level of the first frame.

In one embodiment the reference value is set to determine a data amount of an image signal of the first frame.

In one embodiment the weight value corresponding to the average grayscale level has a value smaller than 1 when the average grayscale level of the first frame is larger than a reference value, and the weight value corresponding to the average grayscale level has a value equal to 1 when the average grayscale level of the first frame is smaller than the reference value.

In one embodiment the average grayscale level is calculated by dividing a value obtained by adding grayscale levels transmitted to the plurality of pixels of the first frame by a number of the pixels.

A method of driving a display device having a panel assembly having a plurality of pixels and a backlight unit having a plurality of backlight unit pixels is provided. The method includes determining a first grayscale level of a first backlight unit pixel from among the plurality of backlight unit pixels; calculating an average grayscale level of a first frame; and applying a weight value corresponding to the average grayscale level of the first frame so as to change the first grayscale level to a compensated grayscale level.

In one embodiment the reference value is set to determine a data amount of an image signal of the first frame.

In one embodiment the weight value is a ratio of maximum compensation luminance to maximum luminance represented by the backlight unit and is set to correspond to the average grayscale level of the first frame.

In one embodiment said determining the first grayscale level of the first backlight unit pixel includes setting the first grayscale level of the first backlight unit pixel according to a plurality of grayscale levels of the plurality of pixels corresponding to the first backlight unit pixel.

In one embodiment calculating the average grayscale level of the first frame includes calculating an average grayscale level of the first frame by dividing a value obtained by adding grayscale levels transmitted to a plurality of pixels of the first frame by a number of pixels.

In one embodiment applying the weight value corresponding to the average grayscale level of the first frame so as to change the first grayscale level to the compensation grayscale level includes setting the weight value corresponding to the average grayscale level to have a value smaller than 1 when the average grayscale level of the first frame is larger than a reference value; and setting the weight value corresponding to the average grayscale level to have a value equal to 1 when the average grayscale level of the first frame is smaller than the reference value.

DETAILED DESCRIPTION OF THE EMBODIMENTS

Figure 1:
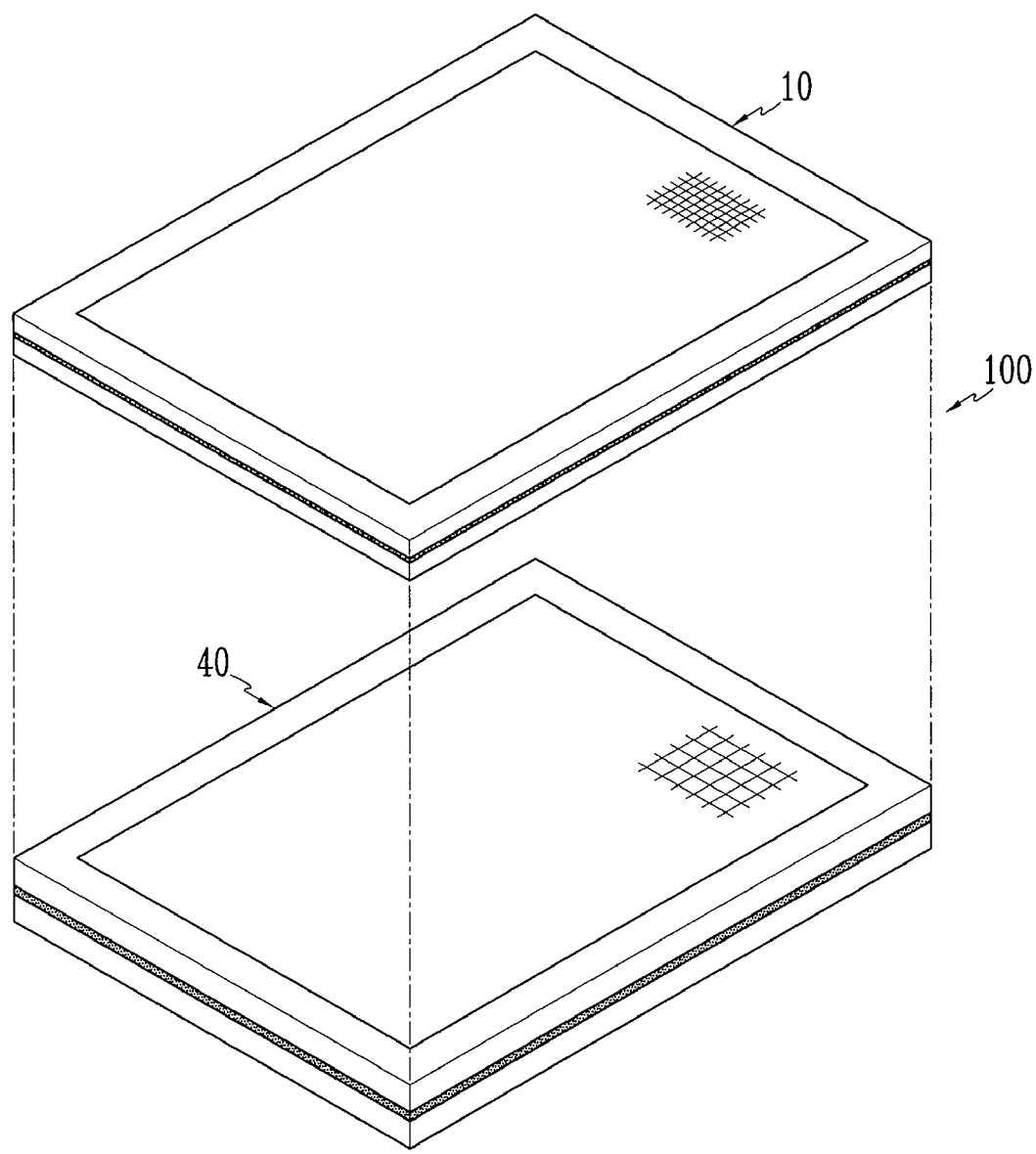
FIG. 1 is an exploded perspective view illustrating a liquid crystal display according to an exemplary embodiment of the present invention.

Backlight units are classified according to the type of light sources. A cold cathode fluorescent lamp (hereinafter, referred to as "CCFL") has been well known among the backlight units. The CCFL uses a line light source. Light generated from the CCFL may be regularly diffused to the liquid crystal panel assembly by an optical member, such as a diffusion sheet, a diffusion plate, or a prism sheet.

However, in the CCFL, since light generated from the CCFL is transmitted to the optical member, a large amount of light may be lost. Generally, in a liquid crystal display using the CCFL, it is known that light that transmits to a liquid crystal panel assembly is about 3 to 5% of the light generated from the CCFL. Further, the backlight unit of the CCFL type needs a large amount of power and consumes most of the power in the liquid crystal display. Since it is difficult to make the CCFL large due to the structure of the CCFL, it is not possible to apply the CCFL to a large-scale liquid crystal display that has a size of 30 inches or more.

In addition, a backlight unit using a light emitting diode (hereinafter, referred to as an "LED") has been known as a backlight unit according to the related art. Generally, the LED is a point light source. A plurality of LEDs are generally provided at the same time. The LEDs are combined with optical members such as a reflective sheet, a light guide plate, a diffusion sheet, a diffusion plate, and a prism sheet so as to form the backlight unit. The backlight unit using the LEDs has a high response speed and excellent color reproducibility, but is high cost and has a large thickness.

As described above, each of the backlight units according to the related art has problems according to the type of light source. Further, since the backlight unit according to the related art is turned on with a predetermined brightness when the liquid crystal display is driven, it is difficult to improve the image quality required for the liquid crystal display.

For example, it is assumed that the liquid crystal panel assembly displays a predetermined image having bright portions and dark portions in accordance with image signals. If the backlight unit supplies light having different intensities to the liquid crystal panel pixels for displaying the bright portions and for displaying the dark portions it is possible to form an image having an excellent dynamic contrast.

Further, it is possible to form better dynamic images by supplying the light having different intensities to the liquid crystal panel assembly using a weight value corresponding to image data that can be displayed by the liquid crystal panel assembly. In addition, it is possible to reduce the power consumption that may be generated in the backlight unit by reducing luminance of the entire backlight unit using weight values applied to the light having different intensities.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the "connection" between two parts includes the "electrical connection" between the two parts with an element interposed therebetween as well as the "direct connection" therebetween. In addition, a part that includes a constituent element means that the part may further include other constituent elements rather than the part which includes only the constituent element.

Throughout the specification, when a first element is referred to as being "on" a second element, the first element may be directly on the second element or may be on one or more other elements interposed between the first and second elements.

FIG. 1 is an exploded perspective view illustrating a liquid crystal display according to an exemplary embodiment of the present invention.

Referring to FIG. 1, a liquid crystal display 100 according to an exemplary embodiment of the present invention includes a liquid crystal panel assembly 10 that has a plurality of pixels provided in the row direction and the column direction, and a backlight unit 40 that has a plurality of pixels provided in the row direction and the column direction, is located at the rear side of the liquid crystal panel assembly 10, and supplies light to the liquid crystal panel assembly 10. The number of pixels provided in the backlight unit 40 is smaller than the number of pixels provided in the liquid crystal panel assembly 10.

Here, the row direction may be defined as one direction of the liquid crystal display 100, for example, a horizontal direction (for example, x-axis direction of FIG. 1) of a screen formed by the liquid crystal panel assembly 10. The column direction may be defined as another direction of the liquid crystal display 100, for example, a vertical direction (for example, y-axis direction of FIG. 1) of the screen formed by the liquid crystal panel assembly 10.

It is assumed that the number of pixels of the liquid crystal panel assembly 10 and the number of pixels of the backlight unit 40 in the row direction are represented by M and M', respectively, and the number of pixels of the liquid crystal panel assembly 10 and the number of pixels of the backlight unit 40 in the column direction are represented by N and N', respectively. Then, the resolution of the liquid crystal panel assembly 10 may be represented by M×N and the resolution of the backlight unit 40 may be represented by M'×N'.

In the exemplary embodiment, M and N, which represent the number of pixels of the liquid crystal panel assembly 10 may be defined by an integer equal to or larger than 240. M' and N', which represent the number of pixels of the backlight unit 40, may be defined by any integer in the range of 2 to 99.

The backlight unit 40 includes a self-emitting display panel having the resolution of M'×N'.

Therefore, one pixel of the backlight unit 40 is disposed to correspond to two or more pixels of the liquid crystal panel assembly 10. Further, the pixels of the backlight unit 40 are controlled to be turned on/off by driving electrodes arranged in a matrix, for example, scan electrodes and data electrodes which cross each other. The intensity of light at the pixels of the backlight unit 40 is controlled by the driving electrodes.

In the present exemplary embodiment, one pixel of the backlight unit 40 includes a field emission array (FEA) type electron emission element.

The FEA type electron emission element includes the scan electrode, the data electrode, electron emission regions and a phosphor layer which are electrically connected to any one of the scan electrode and the data electrode. The electron emission regions may be formed of a material that has a low work function or a high aspect ratio, for example, a carbon material or nanometer (nm) sized material.

The FEA type electron emission element forms an electric field around the electron emission regions by using a voltage difference between the scan electrode and the data electrode so as to emit the electrons, and excites the phosphor layer using the emitted electrons to emit visible light of the intensity corresponding to the emission amount of the electron beam.

Figure 2:
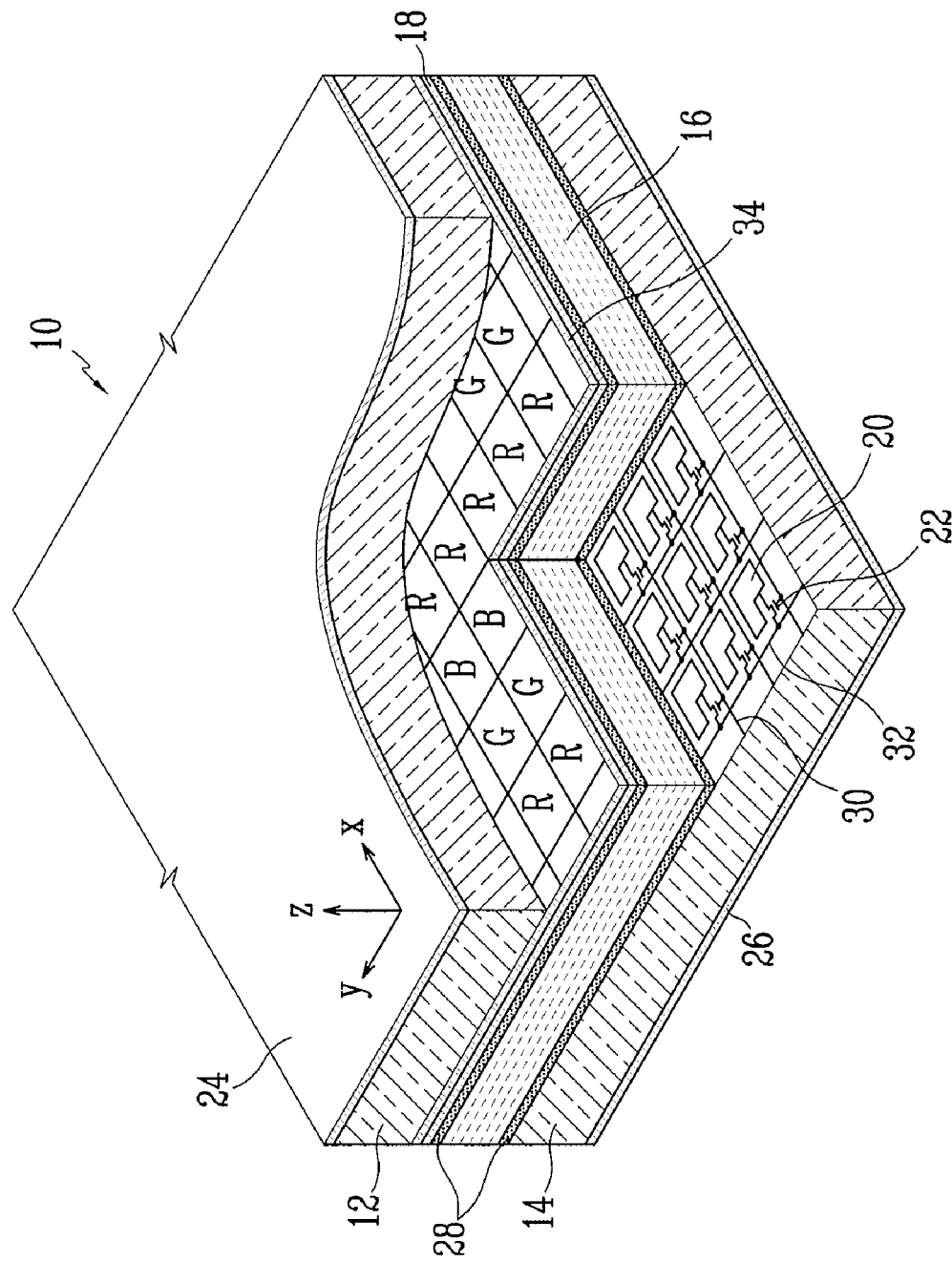
FIG. 2 is a partially cut-away perspective view of the liquid crystal panel assembly shown in FIG. 1.

FIG. 2 is a partially cut-away perspective view of the liquid crystal panel assembly shown in FIG. 1.

Referring to FIG. 2, the liquid crystal panel assembly 10 includes a transparent first substrate 12 and a transparent second substrate 14 that are arranged to be opposite to each other, a liquid crystal layer 16 that is interposed between the first substrate 12 and the second substrate 14, a common electrode 18 provided on an inner surface of the first substrate 12, pixel electrodes 20 and switches 22 that are provided on an inner surface of the second substrate 14. A sealing member (not shown) is provided at the edge of the first substrate 12 and the second substrate 14.

The first substrate 12 becomes a front substrate of the liquid crystal panel assembly 10 and the second substrate 14 becomes a rear substrate of the liquid crystal panel assembly 10. A pair of polarizing plates 24 and 26 whose polarizing axes are perpendicular to each other are provided on external surfaces of the first substrate 12 and the second substrate 14, respectively. Further, an alignment film 28 covers an inner surface of the first substrate 12 where the common electrode 18 is provided, and an inner surface of the second substrate 14 where the pixel electrodes 20 and the switches 22 are provided.

A plurality of gate lines 30 that transmit a gate signal (also referred to as "scan signal") and a plurality of data lines 32 that transmit a data signal are provided on the inner surface of the second substrate 14. The gate lines 30 are provided in parallel in the row direction and the data lines 32 are provided in parallel in the column direction.

The pixel electrodes 20 are provided for every sub-pixel, respectively. Each sub-pixel includes a switch 22 connected to the gate line 30 and the data line 32, a liquid crystal capacitor Clc (not shown) connected to the switch 22, and a storage capacitor Cst (not shown). The storage capacitor Cst may be omitted, if necessary.

The switch 22 may be formed by a thin film transistor. A control terminal and an input terminal of the switch 22 are connected to the individual gate line 30 and the individual data line 32. An output terminal of the switch 22 is connected to the liquid crystal capacitor Clc.

Further, a color filter 34 is disposed between the first substrate 12 and the common electrode 18. The color filter 34 includes red, green, and blue filters each corresponding to one sub-pixel. Three sub-pixels on which the three filters, that is, the red, green, and blue filters are disposed form one pixel.

In the liquid crystal panel assembly 10 that has the above-described structure, if the thin film transistor serving as the switch 22 is turned on, an electric field is generated between the pixel electrode 20 and the common electrode 18. Due to the electric field, the twist angle of the liquid crystal molecules in the liquid crystal layer 16 varies. Therefore, a color image (e.g., a predetermined color image) is formed by controlling the amount of transmitted light for every sub-pixel.

Figure 3:
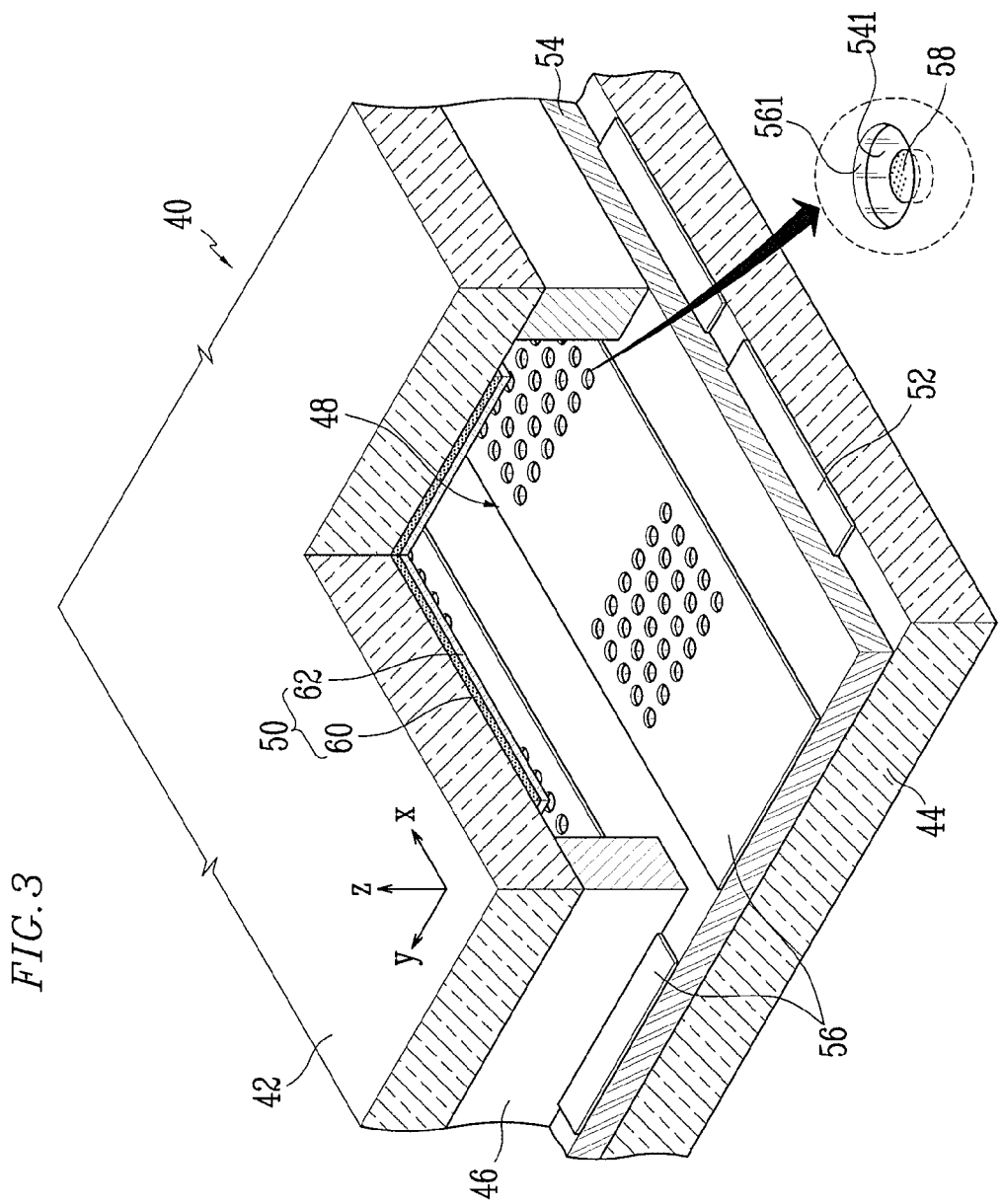
FIG. 3 is a partially cut-away perspective view of a backlight unit according to the first exemplary embodiment of the present invention.
Figure 4:
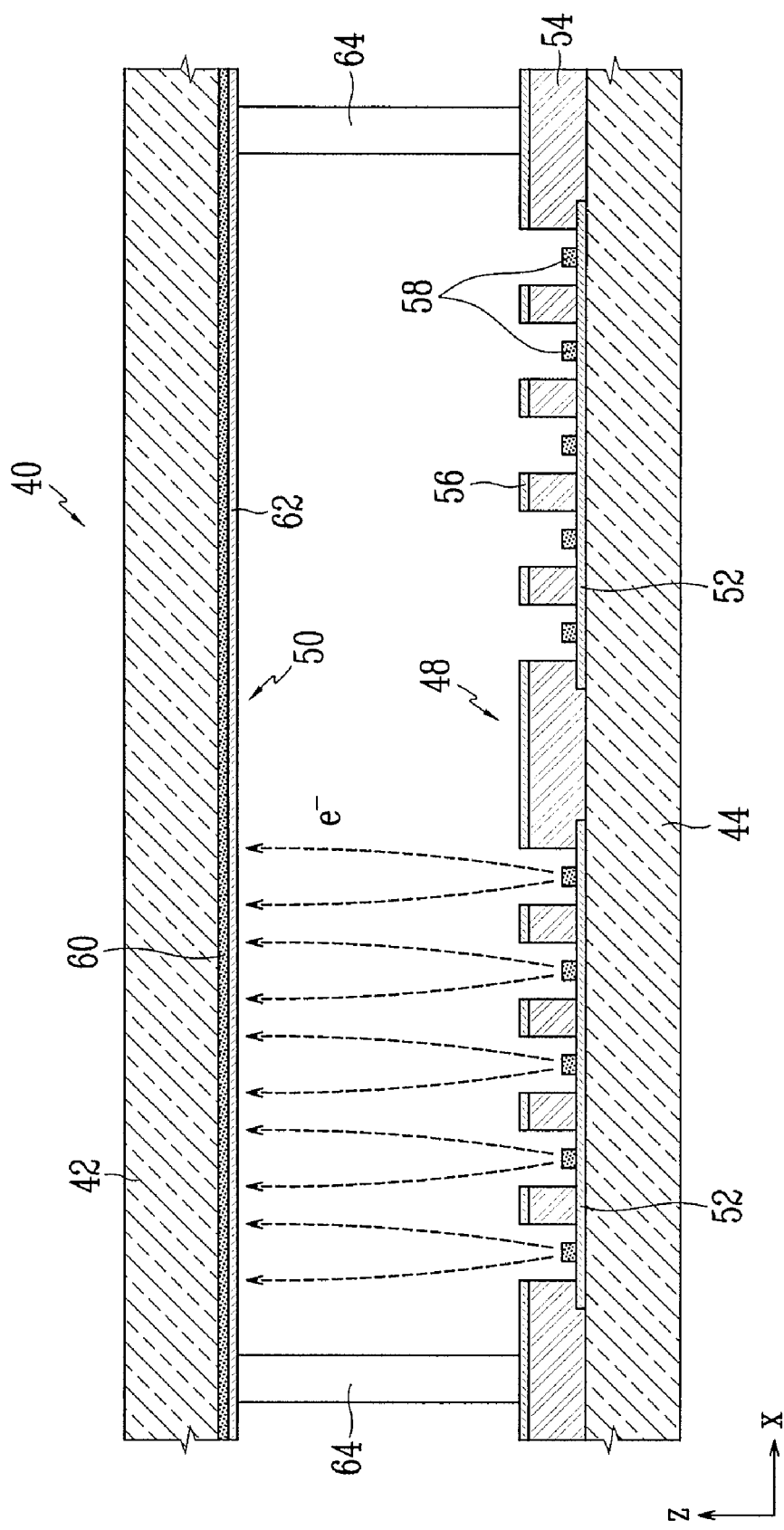
FIG. 4 is a partial cross-sectional view illustrating a fourth substrate and an electron emitting unit shown in FIG. 3.
Figure 5:
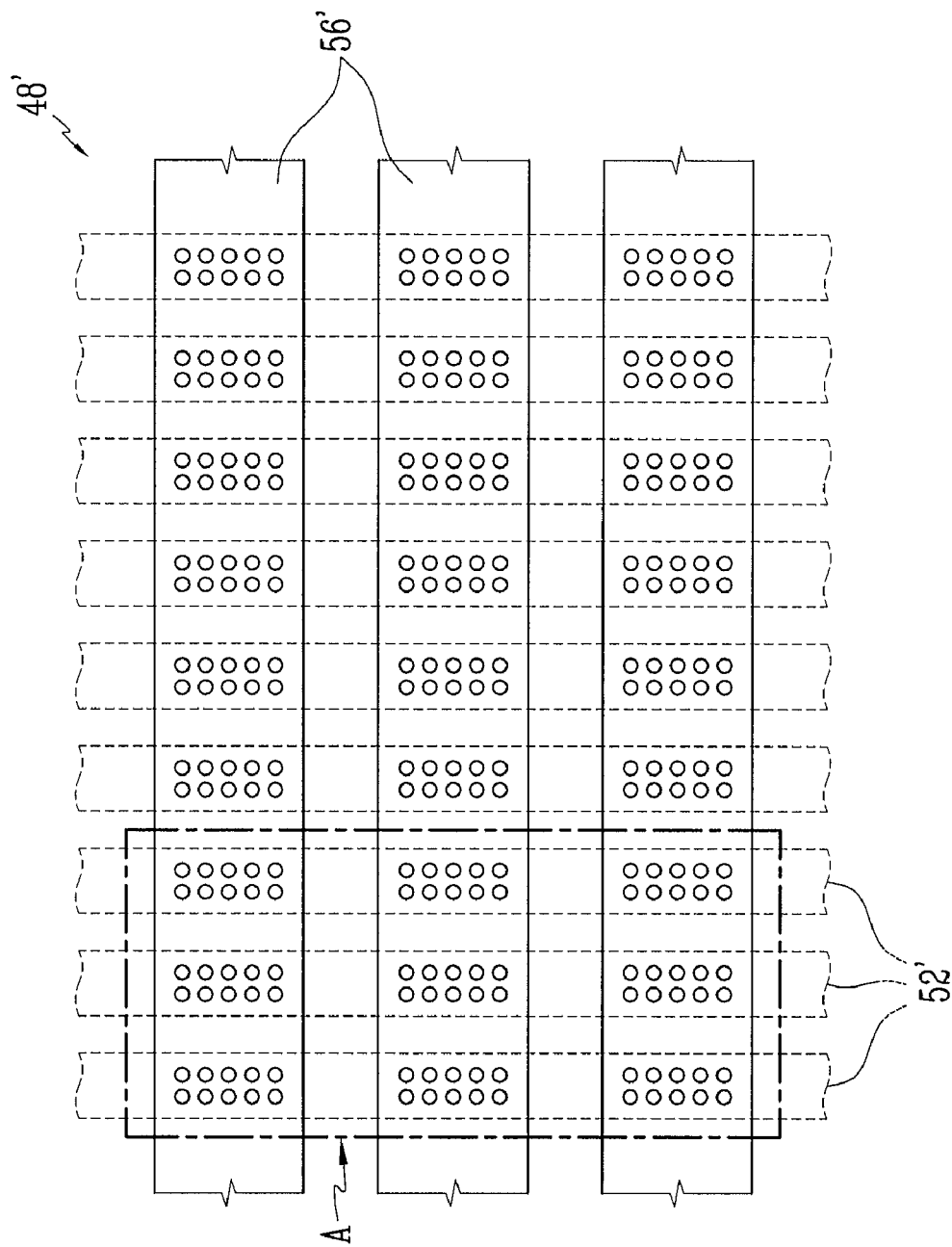
FIG. 5 is a partial plan view illustrating an electron emitting unit of a backlight unit according to a second exemplary embodiment of the present invention.

Referring to FIGS. 3 and 4, a backlight unit according to a first exemplary embodiment will be described. Referring to FIG. 5, a backlight unit according to a second exemplary embodiment will be described. The backlight unit includes an FEA type electron emission display panel which includes FEA type electron emission elements in both exemplary embodiments.

FIG. 3 is a partially cut-away perspective view of a backlight unit according to the first exemplary embodiment of the present invention and FIG. 4 is a partial cross-sectional view illustrating a fourth substrate and an electron emitting unit shown in FIG. 3.

Referring to the drawings, the backlight unit 40 includes a third substrate 42 and a fourth substrate 44 that are arranged opposite to each other while being separated with a gap (e.g., a predetermined gap). A sealing member 46 is disposed at edges of the third substrate 42 and the fourth substrate 44 so as to bond the two substrates to each other. The third substrate 42, the fourth substrate 44, and the sealing member 46 form a vacuum container in which an internal space is exhausted to a vacuum of 6 to 10 Torr.

The third substrate 42 becomes a front substrate of the backlight unit 40 facing the liquid crystal panel assembly and the fourth substrate 44 becomes a rear substrate of the backlight unit 40. An electron emission unit 48 is provided on one side of the fourth substrate 44 facing the third substrate 42 so as to emit electrons. A light emitting unit 50 is provided on one side of the third substrate 42 facing the fourth substrate 44.

First, the electron emission unit 48 will be described. The electron emission unit 48 includes cathodes 52 formed in a stripe pattern along one direction of the fourth substrate 44, gate electrodes 56 formed in a stripe pattern so as to be perpendicular to the cathodes 52 with the insulation layer 54 interposed therebetween, and electron emission regions 58 electrically connected to the cathodes 52.

The gate electrodes 56 may be disposed in parallel to each other in the row direction of the fourth substrate 44 and function as the scan electrodes by being applied with the scan driving voltage. The cathodes 52 may be disposed in parallel to each other in the column direction of the fourth substrate 44 and function as the data electrodes by being applied with the data driving voltage.

The electron emission regions 58 are formed on the cathodes 52 at every region in which the cathodes 52 and the gate electrodes 56 are perpendicular to each other. Further, a plurality of openings 541 and 561 corresponding to the electron emission regions 58 are formed on the insulation layer 54 and the gate electrodes 56, respectively, such that the electron emission regions 58 are exposed on the fourth substrate 44. In the present exemplary embodiment, the region in which the cathode 52 and the gate electrode 56 intersect corresponds to one pixel region of the backlight unit 40.

The electron emission region 58 is formed of materials, such as carbon materials or nanometer (nm) size materials, which emit electrons when the electric field is applied in a vacuum. The electron emission regions 58 may include, for example, carbon nanotube, graphite, graphite nanofiber, diamond, diamond-like carbon, C60, silicon nanowire or combination thereof, and be formed by screen printing, direct growth, chemical vapor deposition or sputtering.

Meanwhile, the electron emission regions may be formed of a tip structure whose front end is pointed and uses molybdenum (Mo) or silicon (Si) as main materials.

Next, the light emitting unit 50 provided below the third substrate 42 includes a phosphor layer 60 and anodes 62 provided on one side of the phosphor layer 60. The phosphor layer 60 may be formed of a white phosphor layer or may have a structure in which red, green and blue phosphor layers are combined. FIG. 3 shows the case where the phosphor layer 60 is formed of a white phosphor layer.

The white phosphor layer may be formed with respect to the entire third substrate 42 or be formed by being separated by a pattern (e.g., a predetermined pattern) such that one white phosphor layer is disposed at every pixel region. The red, green, and blue phosphor layers may be disposed in one pixel region by being separated by the pattern.

The anode 62 may be formed by a metal film, such as aluminum (Al), which covers a surface of the phosphor layer 60. The anode 62 is an accelerating electrode that draws electron beams. The anode 62 is applied with a high voltage (around thousands of DC voltages) to maintain the phosphor layer 60 at a high potential state and reflects visible light emitted toward the fourth substrate 44 from among visible light emitted from the phosphor layer 60 to the third substrate 42 so as to increase image luminance.

In the above-described structure, the FEA type electron emission element includes the cathode 52, the gate electrodes 56, the electron emission regions 58, and the corresponding phosphor layer 60 that form one pixel.

In the above-described structure, if a driving voltage (e.g., a predetermined driving voltage) is applied to the cathodes 52 and the gate electrodes 56, an electric field is generated around the electron emission regions 58 in a pixel region where a voltage difference between the two electrodes is equal to or larger than a threshold value, thereby emitting the electrons. The emitted electrons are guided by the high voltage applied to the anode 62 and come into collision with the corresponding phosphor layer 60, thereby emitting light. The light emitting intensity of the phosphor layer 60 for each pixel corresponds to an electron beam emitting amount of the corresponding electron emission regions.

FIG. 5 is a partial plan view illustrating an electron emitting unit 48' of the backlight unit according to a second exemplary embodiment of the present invention.

Referring to FIG. 5, in the present exemplary embodiment of the invention, one pixel region A is formed by combining two or more regions where the cathodes 52' and the gate electrodes 56' cross. At this time, when one pixel region A is configured by combining two or more cathodes 52' and two or more gate electrodes 56', the two or more cathodes 52' are electrically connected to each other and applied with the same driving voltage. Further, the two or more gate electrodes 56' are also electrically connected to each other and applied with the same driving voltage.

In order to achieve the above, the two or more cathodes 52' and the two or more gate electrodes 56' are extended toward the edge of the fourth substrate 44 such that terminals mounted on connection member (not shown), such as, a flexible printed circuit board (FPCB), may be connected to each other.

FIG. 5 shows an embodiment in which, for example, nine crossing regions in which three cathodes 52' and three gate electrodes 56' cross, form one pixel region A.

Referring to FIGS. 3, 4 and 5, both the backlight unit according to the first exemplary embodiment and the backlight unit according to the second exemplary embodiment, spacers 64 are disposed between the third substrate 42 and the fourth substrate 44 to support a compressive force applied to the vacuum container and maintain a gap between the two substrates. In one embodiment, the spacers 64 are disposed at the corners of the pixel region, and not at a center of the pixel region.

Figure 6:
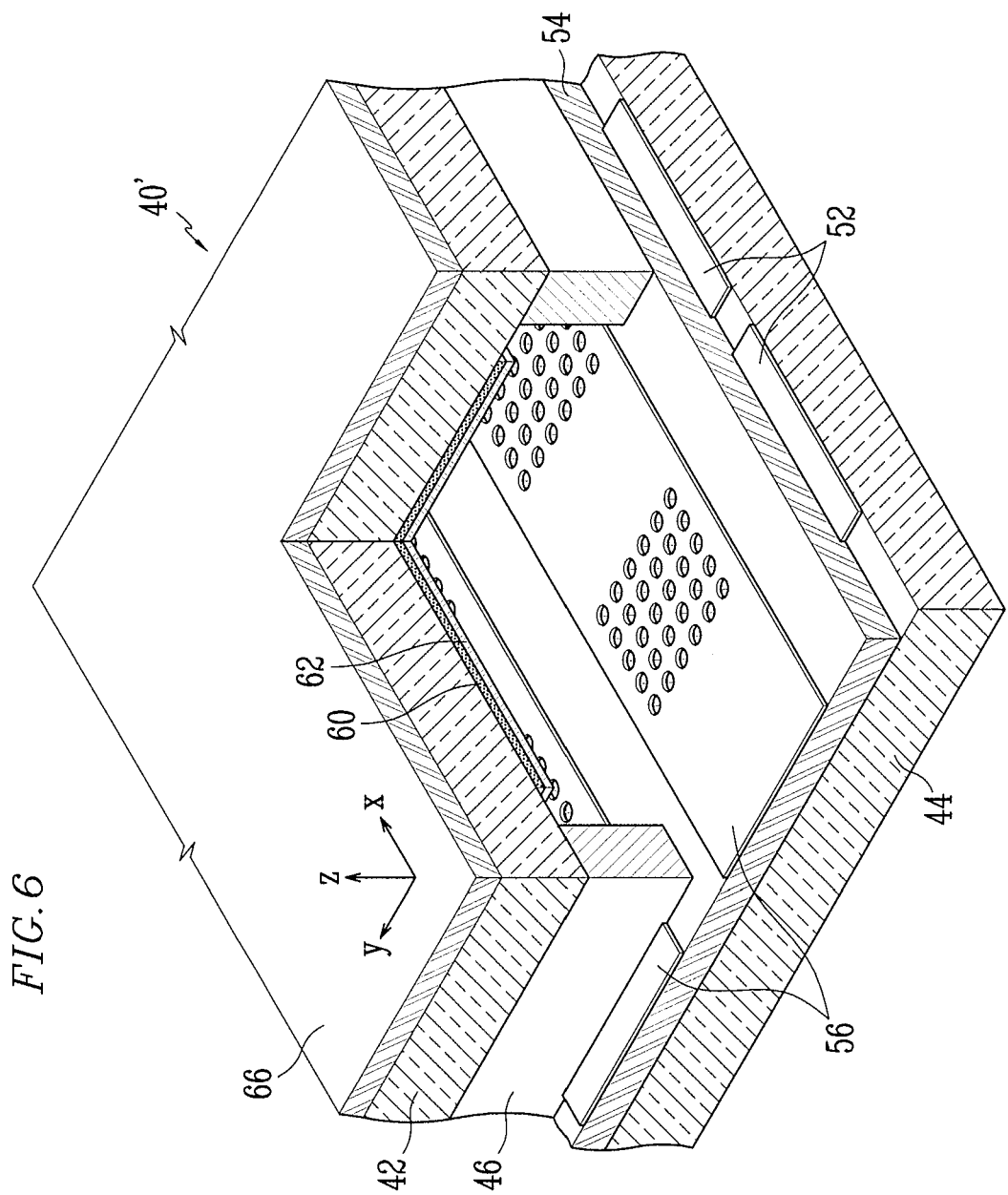
FIG. 6 is a partially cut-away perspective view illustrating a backlight unit according to a third exemplary embodiment of the present invention.

Further, if necessary, the third substrate 42 that is the front substrate may serve as a diffusion plate by including a light diffusion function. As shown in FIG. 6, a diffusion plate 66 that has the light diffusion function may be disposed outside the third substrate 42 facing the liquid crystal panel assembly.

As described above, the liquid crystal display 100 according to the present exemplary embodiment of the invention uses a low resolution display panel having the number of pixels of the liquid crystal panel assembly 10 be greater than the number of pixels of the backlight unit 40. This backlight unit 40 is driven in a passive matrix type using scan electrodes and data electrodes, and supplies light having different intensities to the pixels of the liquid crystal panel assembly 10.

A table below shows a number of pixels of the backlight unit 40 according to the resolution of the liquid crystal panel assembly 10, according to exemplary embodiments of the present invention. The number of pixels is obtained by testing the display quality, a manufacturing cost of the driving circuit unit, and easiness thereof while changing the number of pixels of the backlight unit 40 with respect to the liquid crystal panel assembly 10 having a resolution (e.g., a predetermined resolution).

TABLE 1

| Resolution of liquid crystal panel assembly (M × N) | The number of pixels in liquid crystal panel assembly | The number of pixels in backlight unit | (The number of pixels in liquid crystal panel assembly)/(the number of pixels in backlight unit) |
|---|---|---|---|
| 320 × 240 | 76,800 | 25 to 300 | 256 to 3,072 |
| 640 × 400 | 256,000 | 100 to 1,000 | 256 to 2,560 |
| 640 × 480 | 307,200 | 100 to 1,200 | 256 to 3,072 |
| 800 × 480 | 384,000 | 160 to 1,500 | 256 to 2,400 |
| 800 × 600 | 480,000 | 256 to 2,000 | 240 to 1,875 |
| 1024 × 600 | 614,400 | 144 to 640 | 960 to 4,270 |
| 1024 × 768 | 786,432 | 144 to 768 | 1,024 to 5,464 |
| 1280 × 768 | 983,040 | 192 to 960 | 1,024 to 5,120 |
| 1280 × 1024 | 1,310,720 | 256 to 1,280 | 1,024 to 5,120 |
| 1366 × 798 | 1,090,068 | 256 to 1,344 | 812 to 4,260 |
| 1400 × 1050 | 1,470,000 | 320 to 1,728 | 852 to 4,600 |
| 1600 × 1200 | 1,920,000 | 400 to 2,000 | 950 to 4,800 |
| 1920 × 1200 | 2,304,000 | 400 to 2,400 | 960 to 5,760 |
| 2048 × 1536 | 3,145,728 | 576 to 3,072 | 1,024 to 5,462 |
| 2560 × 2048 | 5,242,000 | 896 to 5,120 | 1,024 to 5,852 |
| 3200 × 2400 | 7,680,000 | 1,440 to 7,500 | 1,024 to 5,334 |

On the basis of the above-described result, it can be understood that the value of (the number of pixels in liquid crystal panel assembly)/(the number of pixels in backlight unit) is in the range of 240 to 5,852 in various embodiments. In one embodiment, if the value is larger than 5,852, it is difficult to improve a dynamic contrast ratio by the backlight unit. In one embodiment, if the value is smaller than 240, it is difficult to manufacture and drive the backlight unit, thereby causing the manufacturing cost to increase.

Further, according to the present exemplary embodiment of the invention, one pixel of the backlight unit 40 may be formed to have a size in the range of 2 to 50 mm in the row direction and/or column direction. In one embodiment, if the pixel size in the row direction and/or column direction is smaller than 2 mm, the backlight unit 40 has a large number of pixels. Therefore, it is difficult to process circuit signals. In one embodiment, if the pixel size in the row direction and/or column direction is larger than 50 mm, the backlight unit 40 does not have enough pixels. Therefore, the effect of improving the image quality by the backlight unit 40 is not noticeable.

As such, since the liquid crystal display 100 according to the present exemplary embodiment of the invention uses the backlight unit 40 having the above-described structure, it has the merits below as compared with the backlight unit using the CCFL and the light LED according to the related art.

The backlight unit 40 according to the present exemplary embodiment of the invention is a surface light source. Therefore, the backlight unit 40 does not need the plurality of optical members used in the backlight units using the CCFL or the LED. Accordingly, in the backlight unit 40 according to the present exemplary embodiment of the invention, there is low or minimal light loss that occurs when the light passes through the optical member and there is no need to emit light having excessive intensity from the backlight unit 40 to compensate for light loss, thereby obtaining excellent efficiency with low power consumption.

Further, the power consumption of the backlight unit 40 according to the present exemplary embodiment of the invention is lower than that of the backlight unit using the CCFL. Further, the backlight unit 40 according to the present exemplary embodiment of the invention does not use the optical member, which decreases the manufacturing cost. Further, the backlight unit 40 according to the present exemplary embodiment of the invention can be further decreased, as compared with the backlight unit using the LED. Furthermore, the size of the backlight unit 40 according to the present exemplary embodiment of the invention can be easily made large and thus easily applied to a large scale liquid crystal display whose size is 30 inches or more.

Figure 7:
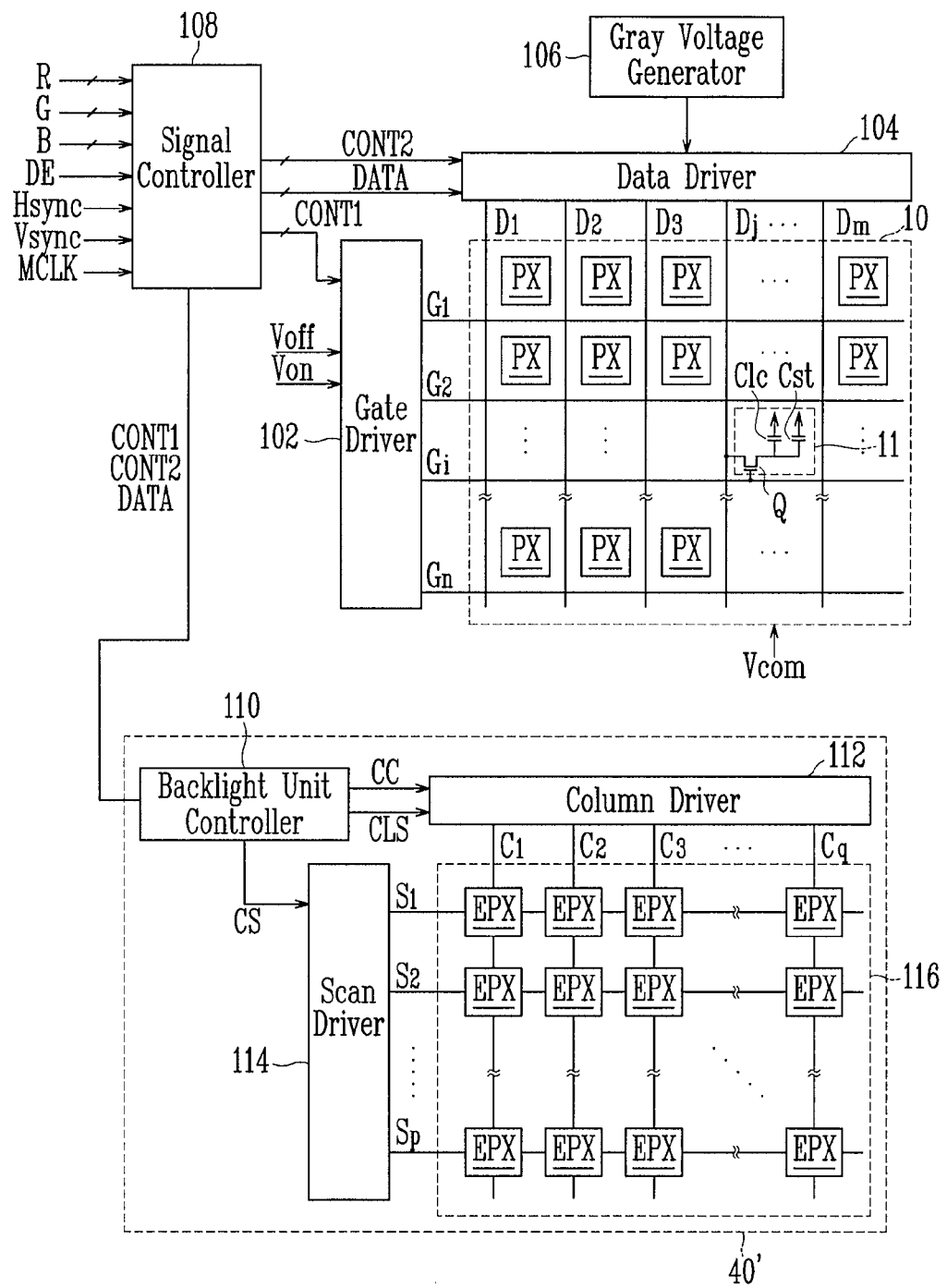
FIG. 7 is a block diagram illustrating a display device according to the exemplary embodiment of the present invention.

FIG. 7 is a block diagram illustrating the display device according to another exemplary embodiment of the present invention. The display device is a light receiving element and includes a liquid crystal panel assembly using liquid crystal elements. However, the present invention is not limited thereto.

As shown in FIG. 7, the display device includes a liquid crystal panel assembly 10, a gate driver 102 and a data driver 104 that are connected to the liquid crystal panel assembly 10, a gray voltage generator 106 connected to the data driver 104, a backlight unit 40', and a signal controller 108 that controls above-described components.

The liquid crystal panel assembly 10 includes a plurality of signal lines G1 to Gn and D1 to Dm and a plurality of pixels PX connected to the plurality of signal lines G1 to Gn and D1 to Dm and are arranged in a matrix format, as shown in the equivalent circuit view of FIG. 7. The signal lines G1 to Gn and D1 to Dm include a plurality of gate lines G1 to Gn that transmit the gate signals (also referred to herein as "scan signal") and the plurality of data lines D1 to Dm that transmit data signals.

Each pixel PX, for example, a pixel 11 connected to an i-th (where i=1, 2, ... and n) gate line G1 and a j-th (where j=1, 2, ..., and m) data line Dj includes a switch Q connected to the signal lines G1 and Dj, a liquid crystal capacitor Clc connected to the switch Q, and a storage capacitor Cst. The storage capacitor Cst may be omitted, if necessary.

The switch Q is a three terminal element such as a thin film transistor that is provided in the lower panel (not shown). A control terminal of the switch Q is connected to the gate line G1, an input terminal of the switch Q is connected to a data line Dj. An output terminal of the switch Q is connected to the liquid crystal capacitor Clc and the storage capacitor Cst.

The gray voltage generator 106 generates two sets of gray voltages (or sets of reference gray voltages) associated with the transmittance of the pixel PX. One of two sets of gray voltages has a positive value with respect to the common voltage Vcom, and the other has a negative value with respect to the common voltage Vcom.

The gate driver 102 is connected to the gate lines G1 to Gn of the liquid crystal panel assembly 10 and applies a gate signal obtained by combining a gate-on voltage Von and a gate-off voltage Voff to the gate lines G1 to Gn.

The data driver 104 is connected to the data lines D1 to Dm of the liquid crystal panel assembly 10, selects a gray voltage from the gray voltage generator 106, and applies the gray voltage to the data lines D1 to Dm as the data signal. However, when the gray voltage generator 106 does not supply the voltages with respect to all of the grayscale levels but supplies a number (e.g., a predetermined number) of reference gray voltages, the data driver 104 divides the reference gray voltage so as to generate the gray voltages with respect to the entire grayscale levels and selects a data signal therefrom.

The signal controller 108 controls the gate driver 102, the data driver 104, and the backlight unit controller 110. The signal controller 108 receives input image signals R, G, and B and input control signals for controlling the display of the image signals from an external graphic controller (not shown).

The input image signals R, G, and B have luminance information of each pixel PX, and the luminance information has a number (e.g., a predetermined number) of gray levels, for example, $1024 (=2^{10})$, $256 (=2^8)$, or $64 (=2^6)$. Examples of the input control signals include a vertical synchronizing signal Vsync, a horizontal synchronizing signal Hsync, a main clock MCLK, and a data enable signal DE.

The signal controller 108 appropriately processes the input image signals R, G, and B according to the operation conditions of the liquid crystal panel assembly 10 on the basis of the input control signals, and generates a gate control signal CONT1 and a data control signal CONT2. Then, the signal controller 108 transmits the gate control signal CONT1 to the gate driver 102, and transmits the data control signal CONT2 and the processed image signals DATA to the data driver 104. Further, the signal controller 108 transmits the gate control signal CONT1, the data control signal CONT2, and the processed image signal DATA to the backlight unit controller 110.

The backlight unit 40' includes a backlight unit controller 110, a column driver 112, a scan d river 114, and a display section 116.

The backlight unit controller 110 according to another exemplary embodiment of the present invention calculates an average grayscale level of an image of a first frame and stores a look up table (LUT) with respect to a weight value corresponding to the calculated average grayscale level. At this time, the weight value is a ratio of maximum compensation luminance with respect to the maximum luminance which can be represented by the backlight unit 40' and is set to correspond to each average grayscale level of the first frame. The maximum compensation luminance is a value of the maximum luminance that can be represented by the backlight unit 40' according to the average grayscale level of the first frame when displaying the image of the first frame. The weight value may have different values according to a user selection. The average grayscale level according to an exemplary embodiment of the present invention can be calculated by adding a plurality grayscales levels to be transmitted to the plurality of liquid crystal pixels PX which form the first frame and dividing the sum by the number of the plurality of liquid crystal pixels PX. Further, a reference value is compared with the average grayscale level of the first frame and arbitrarily set to determine a data amount of the image signal of the first frame. The reference value may vary according to the user selection.

The backlight unit controller 110 detects the highest grayscale level of the plurality of liquid crystal pixels PX corresponding to one pixel EPX in the backlight unit and determines the first grayscale level of the plurality of backlight unit pixels EPX corresponding to the detected grayscale level, by using an image signal DATA with respect to the plurality of liquid crystal pixels PX corresponding to one pixel EPX of the backlight unit. At this time, the backlight unit controller 110 calculates an average grayscale level of the first frame and compares the calculated value with the reference value by using the transmitted image signal DATA.

If the average grayscale level of the first frame is larger than the reference value, the backlight unit controller 110 detects a weight value corresponding to the average grayscale level of the first frame from the LUT. According to another exemplary embodiment of the present invention, if the average grayscale level of the first frame is larger than the reference value, the data amount of the image included in the first frame is large and the weight value detected from the LUT is smaller than 1. Here the sum of currents to be supplied to the plurality of backlight unit pixels EPX is generally larger than a case where the average grayscale level of the first frame is smaller than the reference value. Therefore, if the weight value is set to be smaller than 1, the luminance of the backlight unit 40' may be reduced, thereby reducing the amount of power consumed. Further, the plurality of backlight unit pixels EPX emit light according to the compensation grayscale level changed by reflecting the data amount of images included in each frame, thereby forming more dynamic image. The backlight unit controller 110 according to another exemplary embodiment of the present invention applies a weight value corresponding to the average grayscale level of the first frame to change the first grayscale level of the plurality of backlight unit pixels EPX to the compensation grayscale level. Therefore, the backlight unit controller 110 applies a weight value smaller than 1 to change the first grayscale level of the plurality of backlight unit pixels EPX to the compensation grayscale level. Here the plurality of backlight unit pixels EPX emit light having luminance corresponding to the compensation grayscale level.

For example, when the average grayscale level of the first frame is 165, the reference value is 150, and the first grayscale level of the backlight unit pixel EPX is 255, the backlight unit controller 110 compares the average grayscale level and the reference value. When this occurs, since the average grayscale level is larger than the reference value, a weight value (200/255) corresponding to the average grayscale level of the first frame is detected from the LUT. The backlight unit controller 110 applies the weight value (200/255) to change the first grayscale level 255 of the backlight unit pixel EPX to the compensation grayscale level (255*(200/255)). Therefore, the plurality of backlight unit pixels EPX emit light with luminance corresponding to the compensation grayscale level.

If the average grayscale level of the first frame is smaller than the reference value, the backlight unit controller 110 sets the weight value corresponding to the average grayscale level of the first frame to 1. If the average grayscale level according to another exemplary embodiment of the present invention is smaller than the reference value, the data amount of the image included in the first frame is small. Here the sum of the currents to be supplied to the plurality of backlight unit pixels EPX is smaller than in a case where the average grayscale level of the first frame is equal to or larger than the reference value. Therefore, the backlight unit controller 110 applies the weight value of 1 to change the first grayscale level of the plurality of backlight unit pixels EPX to the compensation grayscale level. Here the compensation grayscale level becomes the same as the first grayscale level and the plurality of backlight unit pixels EPX emit light without compensating the luminance.

For example, if the average grayscale level of the first frame is 125, the reference value is 150, and the first grayscale level of the backlight unit pixel EPX is 180, the backlight unit controller 110 compares the average grayscale level and the reference value. Here since the average grayscale level is smaller than the reference value, a weight value corresponding to the average grayscale level of the first frame is set to 1. The backlight unit controller 110 applies the weight value 1 to change the first grayscale level (180) of the backlight unit pixel EPX to the compensation grayscale level (180*1). Therefore, the plurality of backlight unit pixels EPX emit light with luminance corresponding to the compensation grayscale level. Here the compensation grayscale level becomes the same value as the first grayscale level and the plurality of backlight unit pixels EPX emit light without compensating the luminance.

The backlight unit controller 110 converts the changed compensation grayscale level into a digital data value. Here, the digital data value is included in a light emitting signal CLS and provided to a column driver 112. The light emitting signal CLS according to another exemplary embodiment of the present invention includes 8 bit digital data corresponding to the compensation grayscale level changed by applying the weight value to the first grayscale level of the plurality of backlight unit pixels EPX. Here, the light emitting signal CLS may be the 8 bit digital data. However, the present invention is not limited thereto and may have another value. Further, the backlight unit controller 110 generates a scan driving control signal CS using a gate control signal CONT1. Furthermore, the backlight unit controller 110 generates a light emission control signal CC using the data control signal CONT2 and transmits the generated light emission control signal CC to a column driver 112.

A display section 116 includes a plurality of scan lines S1 to Sp that transmit scan signals, a plurality of column lines C1 to Cq that transmit column signals, and a plurality of light emitting pixels EPX. The plurality of light emitting pixels EPX are provided in a region defined by the scan lines S1 to Sp and the column lines C1 to Cq, which intersect the scan lines. The scan lines S1 to Sp are connected to the scan driver 114 and the column lines C1 to Cq are connected to the column driver 112. The scan driver 114 and the column driver 112 are connected to the backlight unit controller 110 and operate according to a control signal of the backlight unit controller 110.

The plurality of scan lines S1 to Sp are scan electrodes of the above-described backlight unit 40', and the column lines C1 to Cq are data electrodes. Each of the light emitting pixels EPX is formed by the FEA type electron emission element.

The scan driver 114 is connected to the plurality of scan lines S1 to Sp and transmits a scan signal to the gate electrodes such that each of the backlight unit pixels EPX may emit light in synchronization with the plurality of liquid crystal pixels PX corresponding to each of the backlight unit pixels EPX according to the scan driving control signal CS.

The column driver 112 is connected to the plurality of column lines C1 to Cq and controls each of the backlight unit pixels EPX such that the backlight unit pixels EPX may emit light in synchronization with grayscale levels of the plurality of liquid crystal pixels PX corresponding to each of the backlight unit pixels EPX according to the light emission control signal CC and the light emitting signal CLS. The column driver 112 generates a plurality of light emitting data signals according to the light emitting signal CLS and transmits the generated light emitting data signals to the plurality of column lines C1 to Cq according to the light emission control signal CC. That is, the column driver 112 synchronizes the light emitting pixels EPX to emit light at a grayscale level (e.g., a predetermined grayscale level) in accordance with an image to be displayed on a plurality of liquid crystal pixels PX corresponding to one backlight unit pixel EPX.

Figure 8:
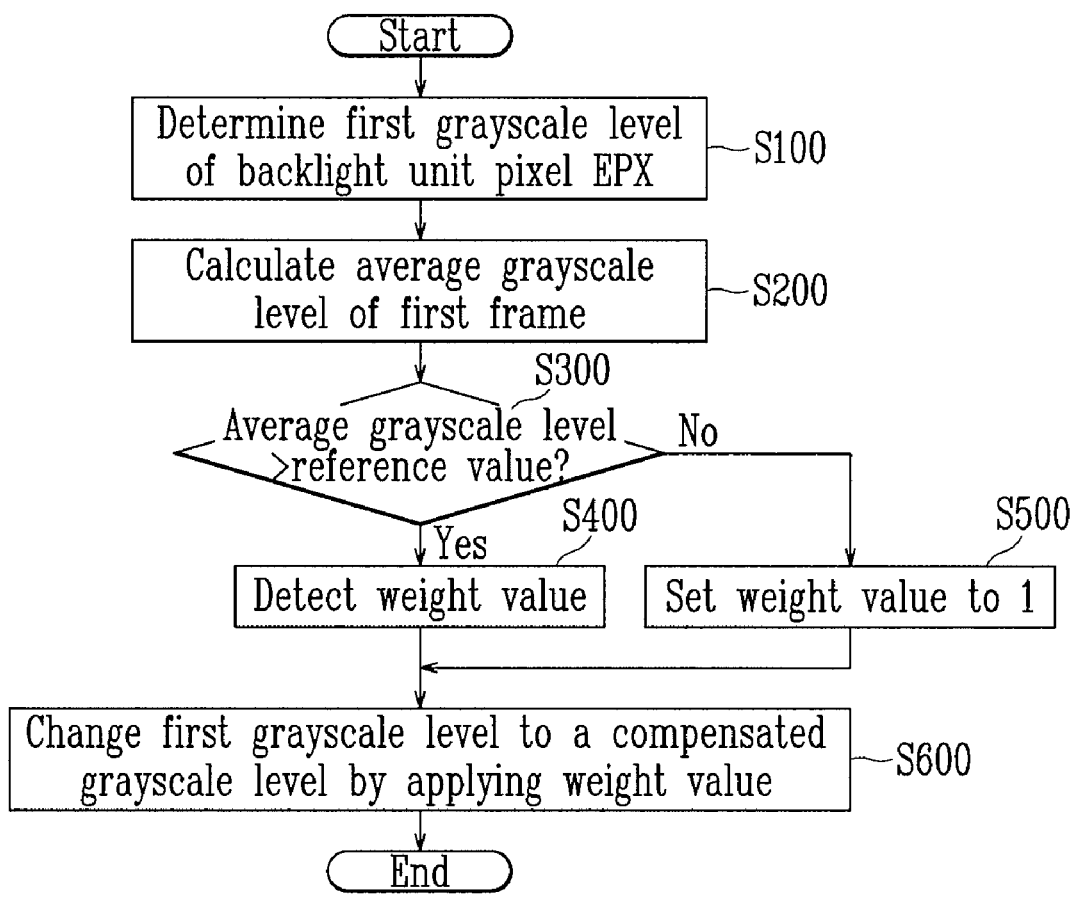
FIG. 8 is a flowchart illustrating a procedure of calculating a grayscale level of a backlight unit pixel EPX according to the exemplary embodiment of the present invention.

Hereinafter, referring to FIG. 8, a method of calculating the grayscale level of the backlight unit pixel EPX according to another exemplary embodiment of the present invention will be described in detail.

The backlight unit controller 110 uses an image signal DATA with respect to the plurality of liquid crystal pixels PX corresponding to one pixel EPX of the backlight unit to detect the highest grayscale level of the plurality of pixels PX corresponding to one pixel EPX of the backlight unit 40'. The backlight unit controller determines the first grayscale level of the plurality of backlight unit pixels EPX corresponding to the detected grayscale level (S100).

The backlight unit controller 110 calculates the average grayscale level of the first frame using the image signal DATA (S200).

The backlight unit controller 110 compares the average grayscale level with the reference value (S300). On the basis of the comparison result at S300, if the average grayscale level is larger than the reference value, the backlight unit controller 110 detects a weight value (S400). Here, the weight value is smaller than 1. On the basis of the comparison result at S300, if the average grayscale level is smaller than the reference value, the backlight unit controller 110 sets the weight value to 1 (S500).

The backlight unit controller 110 applies the weight value to change the first grayscale level of the plurality of backlight unit pixels EPX to a compensated grayscale level (S600). The plurality of backlight unit pixels EPX emit light with luminance corresponding to the compensated grayscale level.

As described above, it is possible to reduce the maximum power consumption by lowering the luminance of the entire backlight unit using the compensation grayscale level changed by applying a weight value to the first grayscale level of the plurality of backlight unit pixels EPX. Further, it is possible to form a dynamic image using the plurality of backlight unit pixels EPX that emit light according to the compensation grayscale level.

Hereinbefore, the display device using the liquid crystal panel assembly according to the exemplary embodiments of the present invention has been described. However, the present invention is not limited thereto. The present invention may be applied to a display device which receives light from a backlight unit to display an image as well as a self-emitting display device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The display device and the driving method thereof according to the exemplary embodiment of the present invention can lower the luminance of the entire backlight unit using the compensation grayscale level, thereby reducing the maximum power consumption.

Further, the display device and the driving method thereof according to another exemplary embodiment of the present invention can form a dynamic image using the backlight unit which emits light according to the compensation grayscale level.

What is claimed is:

1. A display device comprising:
a panel assembly including:
    a plurality of gate lines for transmitting a plurality of gate signals;
    a plurality of data lines for transmitting a plurality of data signals; and
    a plurality of pixels defined by the plurality of gate lines and the plurality of data lines; and
a backlight unit including:
    a plurality of scan lines for transmitting a plurality of scan signals;
    a plurality of column lines for transmitting a plurality of light-emitting data signals; and
    a plurality of backlight unit pixels defined by the plurality of scan lines and the plurality of the column lines,
    wherein the backlight unit is configured to:
        calculate an average grayscale level of an image of a first frame;
        determine a first grayscale level according to the plurality of pixels corresponding to the panel assembly pixels; and
        apply a weight value corresponding to the average grayscale level to change the first grayscale level to a compensated grayscale level,
    wherein the weight value corresponding to the average grayscale level has a value smaller than 1 when the average grayscale level of the first frame is larger than a reference value, and
    the weight value corresponding to the average grayscale level has a value equal to 1 when the average grayscale level of the first frame is smaller than the reference value.

2. The display device of claim 1, wherein when the average grayscale level of the first frame is larger than the reference value, the weight value is a ratio of maximum compensation luminance to maximum luminance represented by the backlight unit and is set to correspond to the average grayscale level of the first frame.

3. The display device of claim 1, wherein the average grayscale level is calculated by dividing a value obtained by adding grayscale levels transmitted to the plurality of pixels of the first frame by a number of the pixels.

4. The display device of claim 1, wherein the reference value is set to determine a data amount of an image signal of the first frame.

5. A method of driving a display device comprising a panel assembly having a plurality of pixels and a backlight unit having a plurality of backlight unit pixels, the method comprising:

determining a first grayscale level of a first backlight unit pixel from among the plurality of backlight unit pixels;

calculating an average grayscale level of a first frame; and applying a weight value corresponding to the average grayscale level of the first frame so as to change the first grayscale level to a compensated grayscale level, wherein applying the weight value corresponding to the average grayscale level of the first frame so as to change the first grayscale level to the compensation grayscale level comprises:

setting the weight value corresponding to the average grayscale level to have a value smaller than 1 when the average grayscale level of the first frame is larger than a reference value; and setting the weight value corresponding to the average grayscale level to have a value equal to 1 when the average grayscale level of the first frame is smaller than the reference value.

6. The method of claim 5, wherein when the average grayscale level of the first frame is larger than the reference value, the weight value is a ratio of maximum compensation luminance to maximum luminance represented by the backlight unit and is set to correspond to the average grayscale level of the first frame.

7. The method of claim 6, wherein said determining the first grayscale level of the first backlight unit pixel comprises setting the first grayscale level of the first backlight unit pixel according to a plurality of grayscale levels of the plurality of pixels corresponding to the first backlight unit pixel.

8. The method of claim 7, wherein calculating the average grayscale level of the first frame comprises calculating an average grayscale level of the first frame by dividing a value obtained by adding grayscale levels transmitted to a plurality of pixels of the first frame by a number of pixels.

9. The method of claim 5, wherein the reference value is set to determine a data amount of an image signal of the first frame.

\* \* \* \* \*